(12) United States Patent
Smith

(10) Patent No.: US 11,292,304 B2
(45) Date of Patent: Apr. 5, 2022

(54) INTEGRATED TRAILER TONGUE

(71) Applicant: REELSTRONG UTLITY FLEET, Manheim, PA (US)

(72) Inventor: Noel Christian Smith, Lancaster, PA (US)

(73) Assignee: REELSTRONG UTILITY FLEET, Manheim, PA (US)

( * ) Notice: Subject to any disclaimer, the term of this patent is extended or adjusted under 35 U.S.C. 154(b) by 130 days.

(21) Appl. No.: 16/990,596

(22) Filed: Aug. 11, 2020

(65) Prior Publication Data

US 2021/0046791 A1    Feb. 18, 2021

Related U.S. Application Data

(60) Provisional application No. 62/885,641, filed on Aug. 12, 2019.

(51) Int. Cl.
*B60D 1/155*    (2006.01)

(52) U.S. Cl.
CPC .................... *B60D 1/155* (2013.01)

(58) Field of Classification Search
CPC ..................................................... B60D 1/155
See application file for complete search history.

(56) References Cited

U.S. PATENT DOCUMENTS

| | | | | |
|---|---|---|---|---|
| 3,083,986 A * | 4/1963 | Moody | ................. | B60P 3/1083 280/35 |
| 3,241,639 A * | 3/1966 | Depuydt | ............... | B60T 11/107 188/112 R |
| 3,428,336 A * | 2/1969 | Thurman | .............. | B60P 3/1083 280/491.2 |
| 3,944,257 A * | 3/1976 | Dockins | .................... | B60P 3/41 280/446.1 |
| 4,773,667 A * | 9/1988 | Elkins | ...................... | B60D 1/40 280/479.3 |
| 5,570,825 A * | 11/1996 | Cona | ......................... | B60R 9/06 224/511 |
| 6,502,845 B1 * | 1/2003 | Van Vleet | .............. | B60D 1/155 280/491.1 |
| 7,377,398 B2 * | 5/2008 | Lichinchi | .............. | B60P 1/5471 104/126 |

\* cited by examiner

*Primary Examiner* — Kevin Hurley
(74) *Attorney, Agent, or Firm* — McNees Wallace & Nurick LLC

(57) ABSTRACT

A structure for use with a trailer tongue including two pairs of opposed sidewalls interconnected to one another to form an integral hollow rectangular structure that is adapted to receive and be secured to an end of a first rectangular tongue member. Each sidewall rotatably carrying a roller, at least a portion of each roller positioned in the interior space of the rectangular structure to substantially prevent contact between the inside surface of the rectangular structure and an outside surface of the second rectangular tongue member. The rectangular structure including a retainer for retaining a latch in a latch installed position, the retainer permitting selective actuation of the latch between the latch installed position and a latch uninstalled position by hand.

19 Claims, 5 Drawing Sheets

INTEGRATED TRAILER TONGUE

FIELD OF THE INVENTION

The present invention is directed to tongues for trailers pulled behind a vehicle.

BACKGROUND OF THE INVENTION

Trailers holding any number of things are pulled behind vehicles. Depending upon the size of the articles to be transported in the trailer, it may be desirable, or even necessary for the trailer tongue to have a different length. Conventional tongues having adjustable lengths are typically difficult to adjust, for reasons including the considerable amount of force required to achieve the length adjustment. Additionally, the latch securing the tongue in the desired length is often remotely positioned along the tongue, which is inconvenient. Furthermore, during conventional manufacture of trailer tongues incorporating these features, measuring devices are required to position components prior to assembly.

It would be desirable in the art for a trailer tongue and method for manufacturing a trailer tongue that does not suffer from these deficiencies.

SUMMARY OF THE INVENTION

In an embodiment, a structure for use with a trailer tongue including two pairs of opposed sidewalls interconnected to one another to form an integral hollow rectangular structure having a first open end, an opposed second open end, and an inside surface defining an interior space, the first open end adapted to receive and be secured to an end of a first rectangular tongue member. Subsequent to the structure being secured to the end of the first rectangular tongue member, the second open end of the structure and the first rectangular tongue member adapted to receive a second rectangular tongue member, the second rectangular tongue member being selectively insertable and movable relative to the structure and the first rectangular tongue member for achieving a plurality of predetermined tongue lengths. The structure further includes each sidewall rotatably carrying a roller, at least a portion of each roller positioned in the interior space of the rectangular structure to substantially prevent contact between the inside surface of the rectangular structure and an outside surface of the second rectangular tongue member. The structure further includes at least one pair of opposed sidewalls of the two pair of opposed sidewalls having corresponding axially aligned openings for receiving an insertable latch. In a latch installed position, the latch extending through the corresponding axially aligned openings of the at least one pair of opposed sidewalls and corresponding axially aligned openings formed in the second rectangular tongue member for achieving a desired tongue length of the plurality of predetermined tongue lengths. The structure further includes the rectangular structure including a retainer for retaining the latch in the latch installed position, the retainer permitting selective actuation of the latch between the latch installed position and a latch uninstalled position by hand.

In another embodiment, a trailer tongue includes a first rectangular tongue member, a second rectangular tongue member, and a latch. The trailer tongue further includes two pairs of opposed sidewalls interconnected to one another to form an integral hollow rectangular structure having a first open end, an opposed second open end, and an inside surface defining an interior space, the first open end is adapted to receive and be secured to an end of the first rectangular tongue member. Subsequent to the rectangular structure being secured to the end of the first rectangular tongue member, the second open end and the first rectangular member are adapted to receive the second rectangular tongue member, the second rectangular tongue member is selectively insertable and movable relative to the first rectangular tongue member for achieving a plurality of predetermined tongue lengths. The trailer tongue further includes each sidewall rotatably carrying a roller, at least a portion of each roller positioned in the interior space of the rectangular structure to substantially prevent contact between the inside surface of the rectangular structure and an outside surface of the second rectangular tongue member. The trailer tongue further includes at least one pair of opposed sidewalls of the two pair of opposed sidewalls having corresponding axially aligned openings for receiving the latch. In a latch installed position, the latch extends through the corresponding axially aligned openings of the at least one pair of opposed sidewalls and corresponding axially aligned openings formed in the second rectangular tongue member for achieving a desired tongue length of the plurality of predetermined tongue lengths. The trailer tongue further includes the rectangular structure including a retainer for retaining the latch in the latch installed position, the retainer permitting selective actuation of the latch between the latch installed position and a latch uninstalled position by hand.

In yet another embodiment, a method for manufacturing a structure for use with a trailer tongue including interconnecting two pairs of opposed sidewalls to one another to form an integral hollow rectangular structure having a first open end, an opposed second open end, and an inside surface defining an interior space, wherein interconnection of the two pairs of opposed sidewalls is achieved without a measuring device. The method further includes securing the first open end of the rectangular structure to an end of a first rectangular tongue member. Subsequent to the rectangular structure being secured to the end of the first rectangular tongue member, the second open end of the rectangular structure and the first rectangular member adapted to receive a second rectangular tongue member having an outside surface, the second rectangular tongue member selectively insertable and movable relative to the first rectangular tongue member for achieving a tongue having a plurality of predetermined lengths. The method further includes securing a roller to each sidewall, at least a portion of each roller positioned in the interior space of the rectangle of the structure to substantially prevent contact between the inside surface of the rectangle of the structure and the outside surface of the second rectangular tongue member. The method further includes forming corresponding openings in at least one pair of opposed sidewalls of the two pair of opposed sidewalls, the corresponding openings for receiving an insertable latch, the latch extending through the corresponding openings of the at least one pair of opposed sidewalls and aligned corresponding openings formed in the second rectangular tongue member for achieving the predetermined tongue length. The method further including securing a retainer to the structure for retaining the latch in an installed position and permitting removal of the latch by hand.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
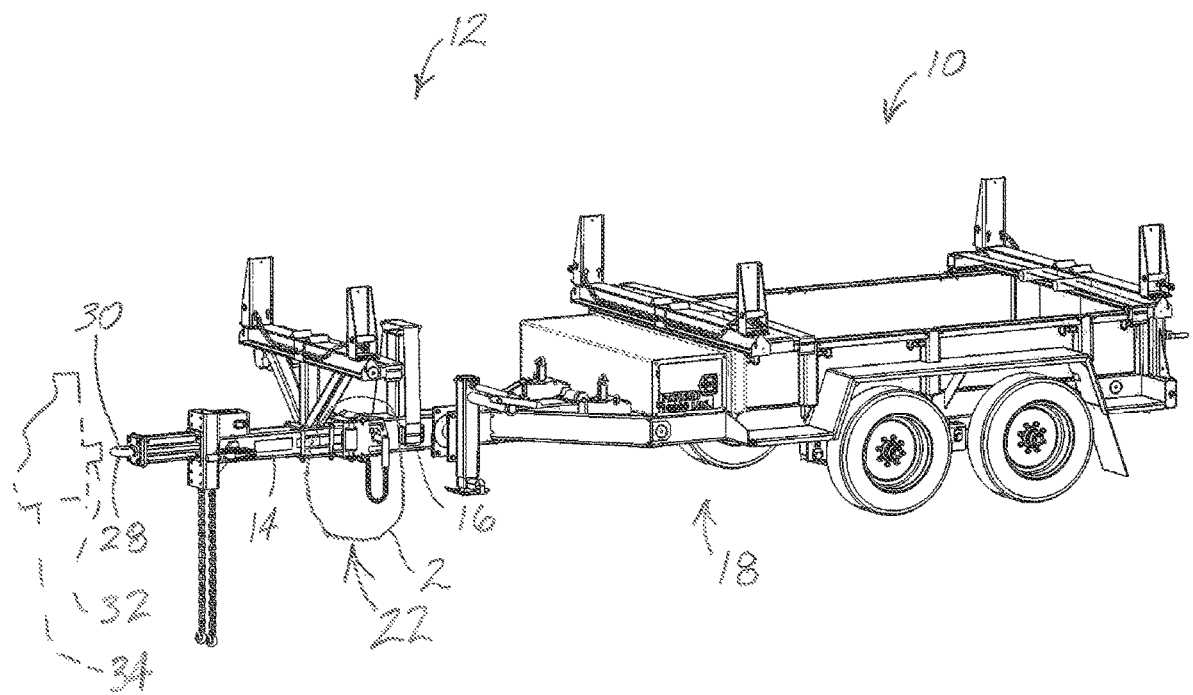
FIG. 1 is an upper perspective view of an exemplary trailer.
Figure 2:
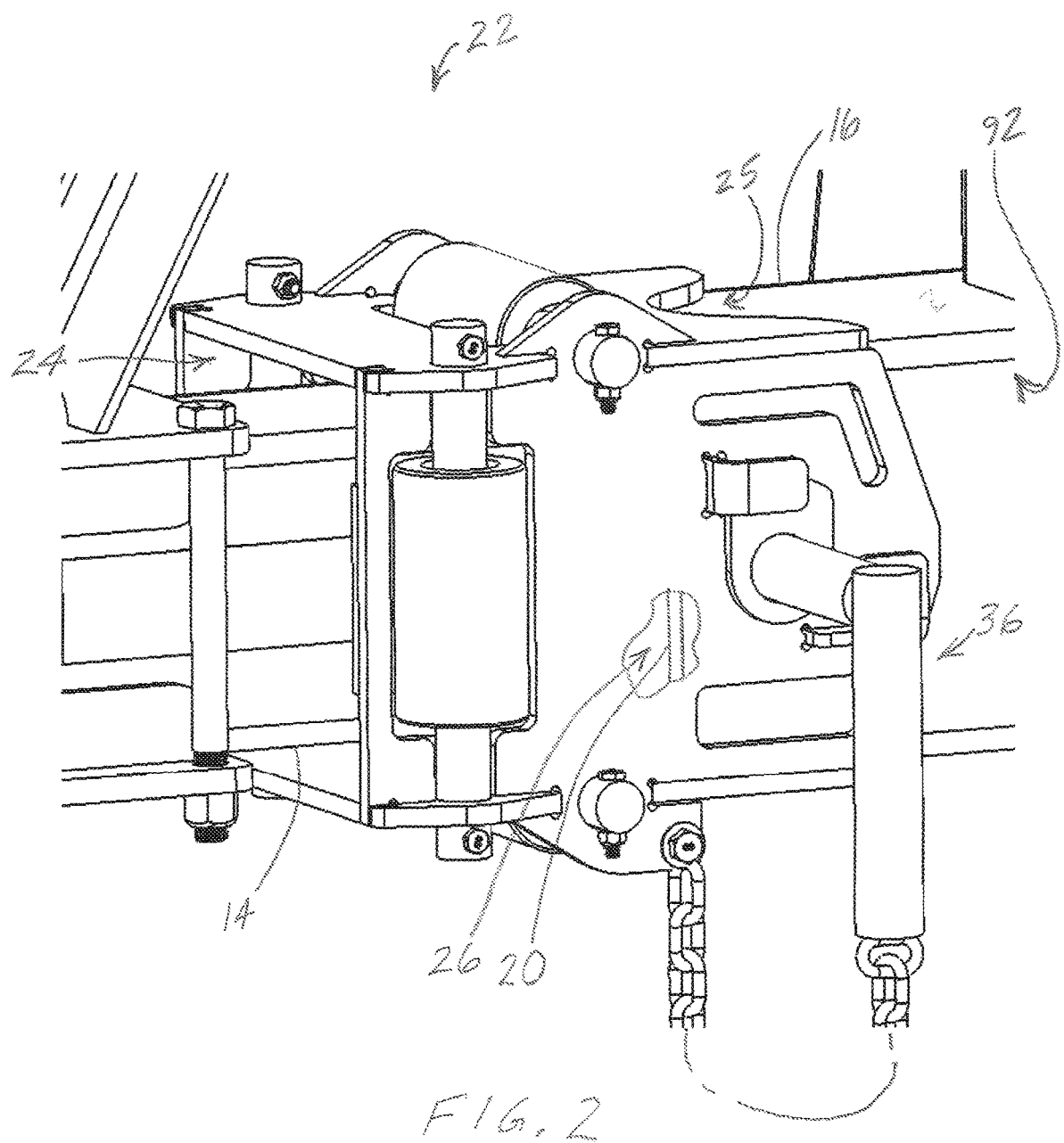
FIG. 2 is an enlarged, partial view of the tongue of the trailer taken from region 2 of FIG. 1.

An exemplary trailer 10 is shown in FIG. 1 including a tongue 12 for coupling to a tow vehicle 34 for transporting articles (not shown) such as poles for supporting cables for power transmission or other uses. As further shown in FIG. 1, tongue 12 includes a pair of rectangular telescoping tube members 14, 16. It is to be understood that other tube cross sectional geometries for the telescoping tube members may be used. In one embodiment, as shown in FIG. 2, tube member 16 extends from a trailer portion 18 (FIG. 1) at one end to an opposed end 20 that is secured to and surrounded by a structure 22. Each of structure 22 and end 20 of tube member 16 define a respective open end 24, 26 that is configured to receive tube member 14. As further shown in FIG. 1, an end 28 of tube member 14 includes a coupler 30 such as a lunette ring that is configured to couple or be secured to a corresponding tow member 32 such as a pintle hook of tow vehicle 34.

Figure 6:
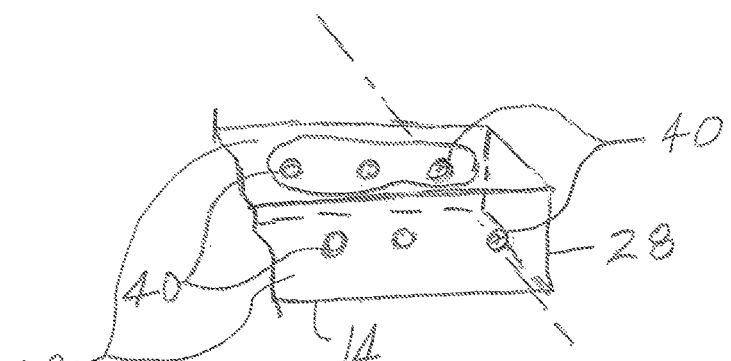
FIG. 6 is a partial cutaway view of an exemplary tongue member of the trailer taken from region 2 of FIG. 1.

Opposite end 28 of tube member 14 is end 28 (FIG. 6) that is inserted into and received by open ends 24, 26 of respective structure 22 (FIG. 2) and tube member 16 (FIG. 2). As shown, latch 36 (FIG. 4) such as an L-shaped pin is inserted through corresponding axially aligned openings 38 (FIG. 4) formed in sidewalls 48, 54 (FIG. 4) of structure 22 (FIG. 4) and also through one pair of corresponding axially aligned openings 40 (FIG. 6) formed in tube member 14 (FIG. 6) to achieve a predetermined tongue length. As a result of tube member 14 (FIG. 6) having a plurality of pairs of corresponding axially aligned openings 40 (FIG. 6), a different predetermined tongue length may be achieved by inserting latch 36 (FIG. 4) through a different pair of axially aligned openings 40 (FIG. 6).

Figure 3:
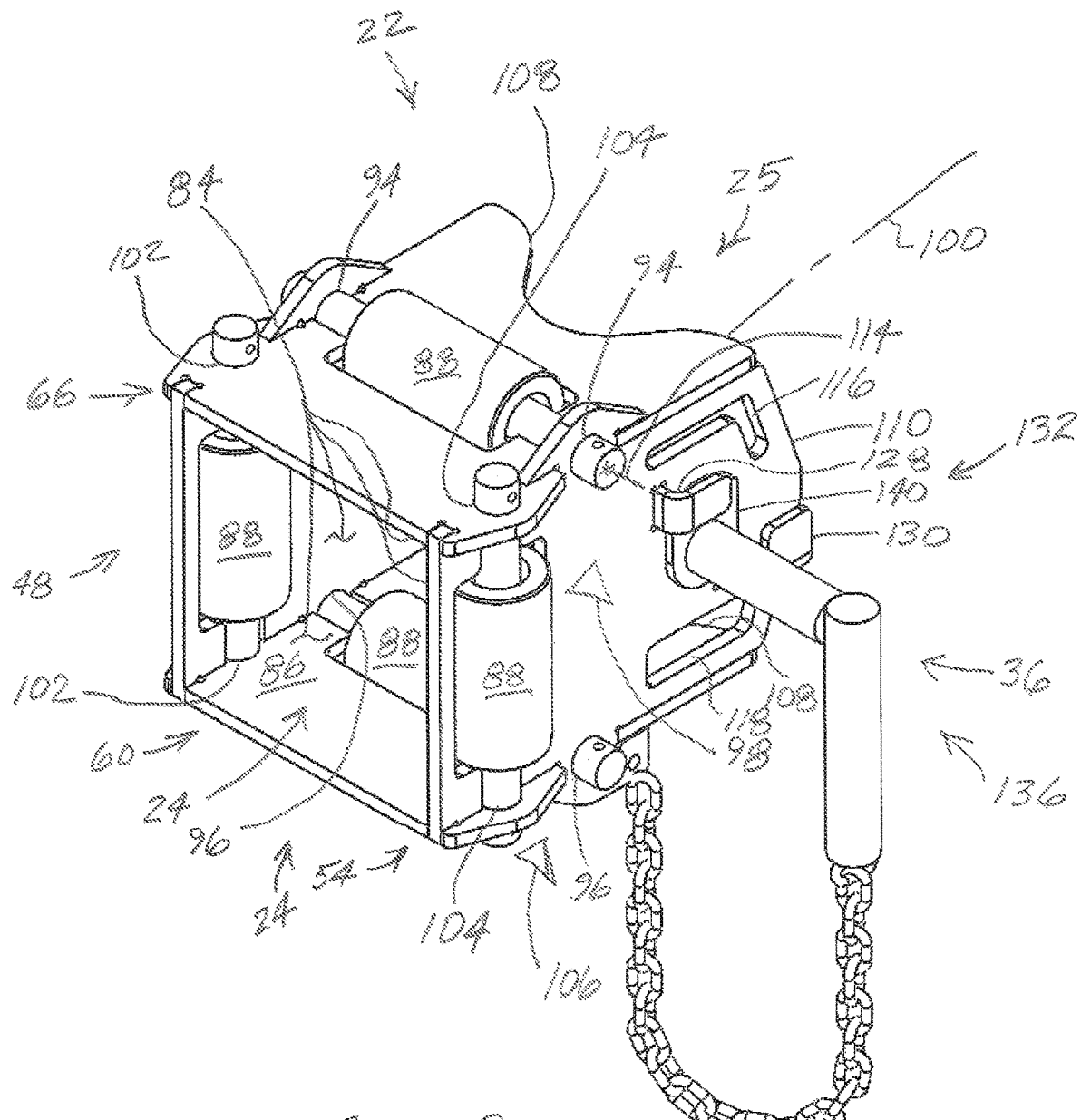
FIG. 3 is a guide/retention assembly of the tongue of FIG. 2.
Figure 5:
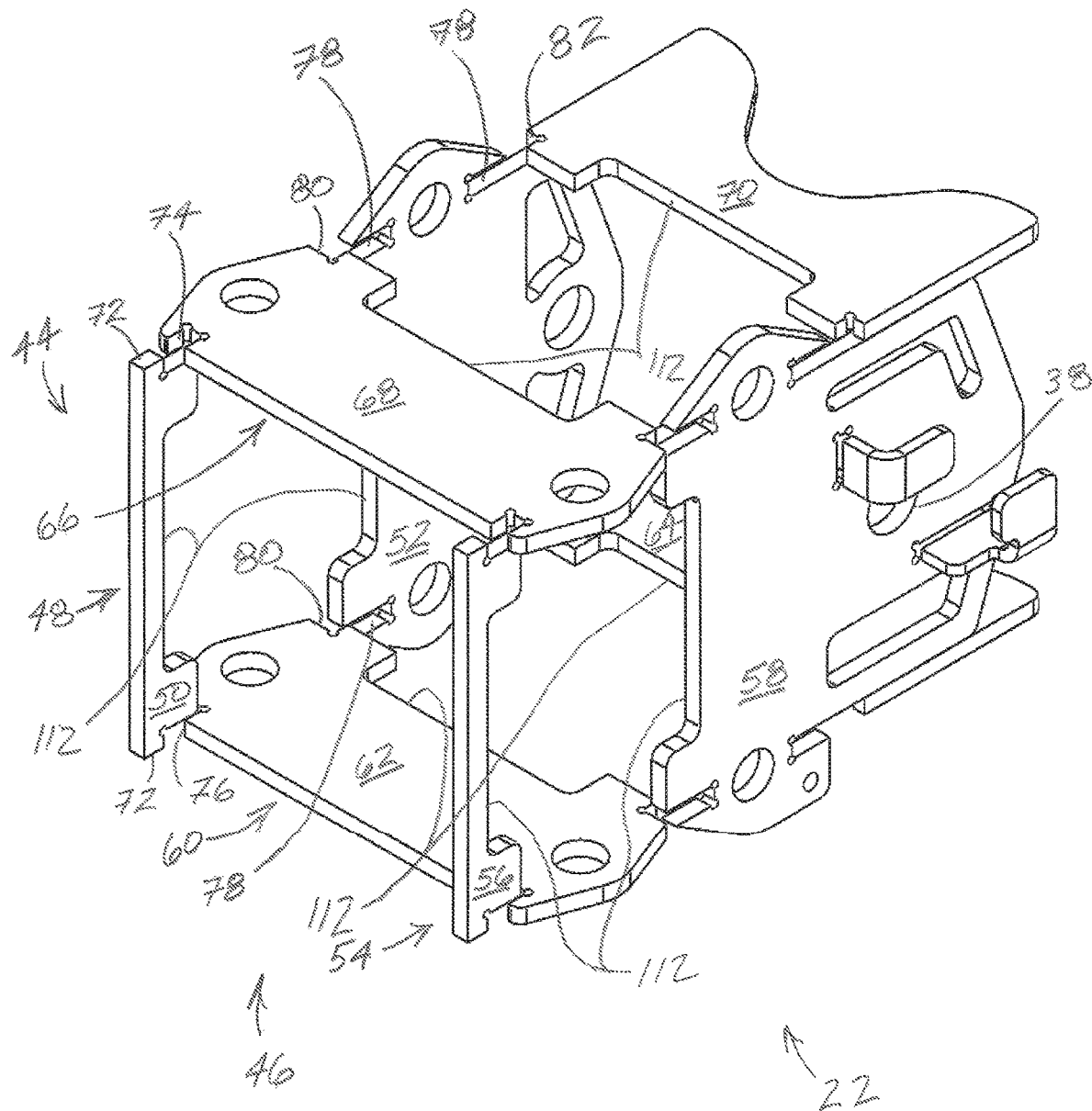
FIG. 5 is an exploded view of the structure of the guide/retention assembly of FIG. 4.

Structure 22 is now discussed. As shown in FIG. 5, which is an enlarged exploded view for purposes of clarity, structure 22 includes two pairs of sidewalls 44, 46 that are interconnected to form an integral hollow rectangular structure having opposed open ends 24, 25 (FIG. 3). Pair of sidewalls 44 includes sidewall 48 having sidewall portions 50, 52 and sidewall 54 having sidewall portions 56, 58. Pair of sidewalls 46 includes sidewall 60 having sidewall portions 62, 64 and sidewall 66 having sidewall portions 68, 70. Each sidewall portion has corresponding mating features. For example, sidewall portion 50 of sidewall 48 includes opposed posts 72; one post 72 is received in slot 74 of sidewall portion 68, and the other post 72 is received in slot 76 of sidewall portion 62. Similarly, sidewall portion 52 of sidewall 48 includes two pairs of opposed slots 78; the first pair of slots 78 are received by respective recessed shoulders 80 of sidewall portions 62, 68, and the second pair of slots 78 are received by respective recessed shoulders 82 of sidewall portions 64, 70 (slot 78 in sidewall portion 52 and corresponding shoulder 82 of sidewall portion 64 are not shown in FIG. 5). In one embodiment, the sidewall portions are cut using an industrial metal-cutting laser, sometimes referred to as a laser cutter or laser cutting machine, forming highly precise corresponding mating features/edges (e.g., posts, slots, shoulders, etc.) and resulting in an unambiguous assembly similar to jigsaw puzzle pieces (i.e., only one way to properly assemble the corresponding features together). Once assembled, the resulting joints formed by bringing together the corresponding posts/slots and shoulders/slots may be secured such as by welding, adhesive or other suitable manufacturing technique. One having ordinary skill in the art can appreciate the remaining sidewall portions are interconnected in a similar fashion as previously discussed, and therefore, for purposes of brevity, are not further discussed herein.

Structure 22 is further discussed. As shown in FIG. 3, hollow rectangular structure 22 further includes opposed open ends 24, 25 with sidewalls 48, 54, 60, 66 having collective inside surfaces 84 defining an interior space 86. Each sidewall 48, 54, 60, 66 rotatably carries a roller 88. In one embodiment, as shown in FIG. 5, the facing edges 112 separating each of the sidewall portions for each of sidewalls 48, 54, 60, 66 defines the recess in each sidewall for receiving roller 88. As shown in FIG. 3, at least a portion of each roller 88 extends into interior space 86 of sidewalls 48, 54, 60, 66 of structure 22. As a result, the outside surfaces 90 (FIG. 6; only two of the four outside surfaces 90 are shown in FIG. 6) of tube member 14 are substantially prevented from contacting inside surface 84 of structure 22 and inside surface 92 of tube member 16, thereby reducing the amount of force required to move tube member 14 along the tongue axis to adjust the tongue length. As further shown in FIG. 3, a pair of axially openings 94 formed in respective sidewalls 48, 54 receive roller 88, and a pair of axially aligned openings 96 formed in respective sidewalls 48, 54 receive roller 88 for rotatably carrying the corresponding pair of rollers 88. This pair of rollers 88 is aligned in a plane 98 that is transverse to trailer axis 100. Similarly, a pair of axially openings 102 formed in respective sidewalls 60, 66 receive roller 88, and a pair of axially aligned openings 104 formed in respective sidewalls 60, 66 receive roller 88 for rotatably carrying a corresponding pair of rollers 88. This pair of rollers 88 is aligned in a plane 106 that is transverse to trailer axis 100, with plane 98, 106 being parallel to one another and spaced apart from one another. In one embodiment, In one embodiment, each of rollers 88 is aligned in a single plane that is transverse to the trailer tongue axis, such as by utilizing a roller shaft construction resembling a "C," or by utilizing spherical ball rollers such as manufactured by National Precision Bearing of Preston, Wash. that are secured to the inside surface 84 (FIG. 3) of structure 22.

The term "surface" in the context of inside or outside surface of a tube member is intended to include all inside or outside surfaces of the respective tube member.

Integral structure 22 is further discussed. As shown in FIG. 3, for example, a curved edge 108 is formed in each of sidewalls 60, 66, and an edge 110 having a plurality such as three linear portions formed in each of sidewalls 48, 54. At least a portion of each of edges 108, 110 are nonparallel to axis 114 extending through openings 94 for rotatably receiving roller 88, which axis 114 being transverse to trailer axis 100. As a result, edges 108, 110 have an extended length compared to edges entirely transverse to the trailer axis, providing a guide for placement of a lap weld to secure structure 22 and tube member 16 (FIG. 2) that has enhanced strength.

Figure 4:
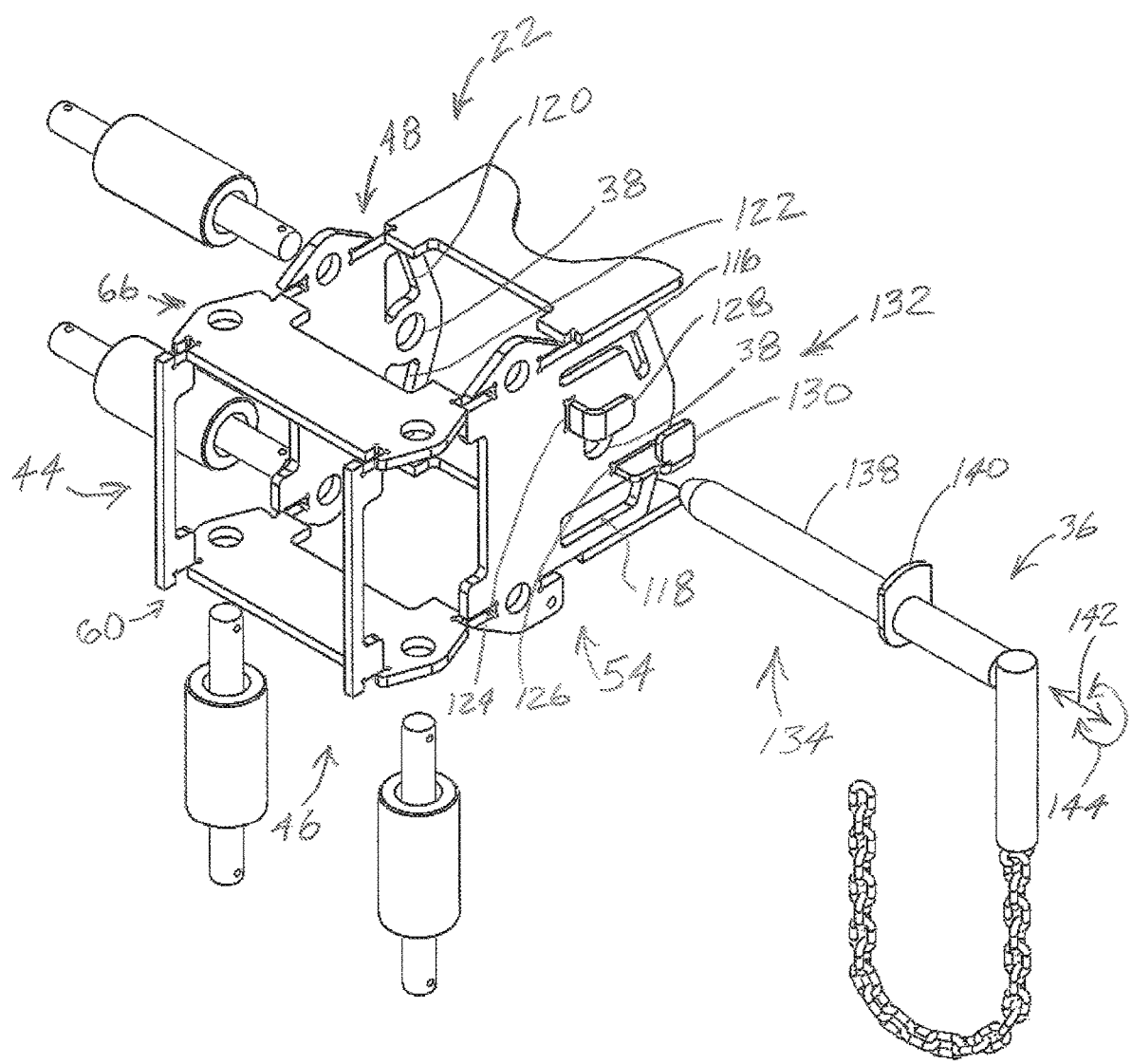
FIG. 4 is an exploded view of the guide/retention assembly of FIG. 3.

As shown in FIG. 4, structure 22 further includes a plurality of closed geometry cutouts, such as cutouts 116, 118 formed in sidewall 54 and cutouts 120, 122 formed in sidewall 48. These cutouts define locations for plug welds for securing structure 22 and tube member 16 (FIG. 2) to provide enhanced weld strength between structure 22 and tube member 16 (FIG. 2), especially when combined with the lap welds previously discussed.

As collectively shown in FIGS. 3 and 4, structure 22 includes cutouts 124, 126 (FIG. 4) for locating/securing respective retainer portions 128, 130 of retainer 132 for selectively receiving latch 36 between a latch uninstalled position 134 (FIG. 4) and a latch installed position 136 (FIG. 3) by hand by an operator/worker (not shown). That is, as shown in FIG. 4, the operator/worker by hand directs shaft 138 in axial movement 144 in a direction toward and then inside of axially aligned openings 38 of structure 22 until stop 140 abuts retainer portion 128, followed by the operator/worker by hand applying a rotational movement 144 of latch 36 (FIG. 4) to clear stop 140, followed by the operator/worker by hand further directing shaft 138 in axial movement 144 inside of axially aligned openings 38 until latch 36 is in latch installed position (FIG. 3). To remove latch 36 from structure 22, the order of operator/worker movements discussed is reversed.

As a result of structure 22 having respective cutouts 124, 126 that can be unambiguously positioned by the operator/worker by hand to latch portions 128, 130, similar to a jigsaw puzzle, which latch portions 128, 130 can then be secured to structure 22 such as by welding, and the corresponding posts/slots/shoulders that can be used by the operator/worker by hand to unambiguously position and interconnect the sidewall portions of sidewalls 48, 54, 60, 66 together, similar to a jigsaw puzzle, which interconnected sidewalls can then be secured together such as by welding, interconnection of the two pairs 44, 46 of opposed sidewalls 48, 54, 60, 66 to one another and also to retainer 132 can be achieved without a measuring device such as a tape measure.

The term "by hand" is believed to be self explanatory, at the least, the magnitude of forces and level of manual dexterity associated with successfully achieving installation and removal of a given task would be possessed by any operator/worker capable of directly grasping and manipulating one or more components that would otherwise be able to use tools in order to achieve the same task.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A structure for use with a trailer tongue comprising:
   two pairs of opposed sidewalls interconnected to one another to form an integral hollow rectangular structure having a first open end, an opposed second open end, and an inside surface defining an interior space, the first open end adapted to receive and be secured to an end of a first rectangular tongue member, wherein subsequent to the structure being secured to the end of the first rectangular tongue member, the second open end of the structure and the first rectangular tongue member adapted to receive a second rectangular tongue member, the second rectangular tongue member being selectively insertable and movable relative to the structure and the first rectangular tongue member for achieving a plurality of predetermined tongue lengths;
   each sidewall rotatably carrying a roller, at least a portion of each roller positioned in the interior space of the rectangular structure to substantially prevent contact between the inside surface of the rectangular structure and an outside surface of the second rectangular tongue member;
   at least one pair of opposed sidewalls of the two pair of opposed sidewalls having corresponding axially aligned openings for receiving an insertable latch, wherein in a latch installed position, the latch extending through the corresponding axially aligned openings of the at least one pair of opposed sidewalls and corresponding axially aligned openings formed in the second rectangular tongue member for achieving a desired tongue length of the plurality of predetermined tongue lengths;
   wherein the rectangular structure including a retainer for retaining the latch in the latch installed position, the retainer permitting selective actuation of the latch between the latch installed position and a latch uninstalled position by hand.

2. The structure of claim 1, wherein interconnection of the two pairs of opposed sidewalls to one another and to the retainer is achieved without a measuring device.

3. The structure of claim 1, wherein the rollers rotatably carried by at least the one pair of opposed sidewalls are aligned in a plane transverse to the axis of the corresponding axially aligned openings in the at least one pair of opposed sidewalls of the two pair of opposed sidewalls.

4. The structure of claim 1, wherein the rollers rotatably carried by at least the two pairs of opposed sidewalls are aligned in a plane transverse to the axis of the corresponding axially aligned openings in the at least one pair of opposed sidewalls of the two pair of opposed sidewalls.

5. The structure of claim 1, wherein at least a portion of an edge of at least one sidewall is nonparallel to the axis of the corresponding axially aligned openings in the at least one pair of opposed sidewalls of the two pair of opposed sidewalls.

6. The structure of claim 1, wherein a cutout configured for forming a plug weld with the first rectangular tongue member is formed in at least one sidewall of the two pair of opposed sidewalls.

7. The structure of claim 1, wherein the retainer includes two retainer members.

8. The structure of claim 1, wherein each sidewall of the two pairs of opposed sidewalls are formed by a laser cutting machine.

9. A trailer tongue comprising
   a first rectangular tongue member;
   a second rectangular tongue member;
   a latch;
   two pairs of opposed sidewalls interconnected to one another to form an integral hollow rectangular structure having a first open end, an opposed second open end, and an inside surface defining an interior space, the first open end is adapted to receive and be secured to an end of the first rectangular tongue member, wherein subsequent to the rectangular structure being secured to the end of the first rectangular tongue member, the second open end and the first rectangular member are adapted to receive the second rectangular tongue member, the second rectangular tongue member is selectively insertable and movable relative to the first rectangular tongue member for achieving a plurality of predetermined tongue lengths;

each sidewall rotatably carrying a roller, at least a portion of each roller positioned in the interior space of the rectangular structure to substantially prevent contact between the inside surface of the rectangular structure and an outside surface of the second rectangular tongue member;

at least one pair of opposed sidewalls of the two pair of opposed sidewalls having corresponding axially aligned openings for receiving the latch, wherein in a latch installed position, the latch extends through the corresponding axially aligned openings of the at least one pair of opposed sidewalls and corresponding axially aligned openings formed in the second rectangular tongue member for achieving a desired tongue length of the plurality of predetermined tongue lengths;

wherein the rectangular structure including a retainer for retaining the latch in the latch installed position, the retainer permitting selective actuation of the latch between the latch installed position and a latch uninstalled position by hand.

10. The trailer tongue of claim 9, wherein interconnection of the two pairs of opposed sidewalls to one another and to the retainer is achieved without a measuring device.

11. The trailer tongue of claim 9, wherein the rollers rotatably carried by at least the one pair of opposed sidewalls are aligned in a plane transverse to the axis of the corresponding axially aligned openings in the at least one pair of opposed sidewalls of the two pair of opposed sidewalls.

12. The trailer tongue of claim 9, wherein the rollers rotatably carried by at least the two pairs of opposed sidewalls are aligned in a plane transverse to the axis of the corresponding axially aligned openings in the at least one pair of opposed sidewalls of the two pair of opposed sidewalls.

13. The trailer tongue of claim 9, wherein at least a portion of an edge of at least one sidewall is nonparallel to the axis of the corresponding axially aligned openings in the at least one pair of opposed sidewalls of the two pair of opposed sidewalls.

14. The trailer tongue of claim 9, wherein a cutout configured for forming a plug weld with the first rectangular tongue member is formed in at least one sidewall of the two pair of opposed sidewalls.

15. The trailer tongue of claim 9, wherein the retainer includes two retainer members.

16. The trailer tongue of claim 9, wherein each sidewall of the two pairs of opposed sidewalls are formed by a laser cutting machine.

17. A method for manufacturing a structure for use with a trailer tongue comprising:
  interconnecting two pairs of opposed sidewalls to one another to form an integral hollow rectangular structure having a first open end, an opposed second open end, and an inside surface defining an interior space, wherein interconnection of the two pairs of opposed sidewalls is achieved without a measuring device;
  securing the first open end of the rectangular structure to an end of a first rectangular tongue member, wherein subsequent to the rectangular structure being secured to the end of the first rectangular tongue member, the second open end of the rectangular structure and the first rectangular member adapted to receive a second rectangular tongue member having an outside surface, the second rectangular tongue member selectively insertable and movable relative to the first rectangular tongue member for achieving a tongue having a plurality of predetermined lengths;
  securing a roller to each sidewall, at least a portion of each roller positioned in the interior space of the rectangle of the structure to substantially prevent contact between the inside surface of the rectangle of the structure and the outside surface of the second rectangular tongue member;
  forming corresponding openings in at least one pair of opposed sidewalls of the two pair of opposed sidewalls, the corresponding openings for receiving an insertable latch, wherein the latch extending through the corresponding openings of the at least one pair of opposed sidewalls and aligned corresponding openings formed in the second rectangular tongue member for achieving the predetermined tongue length;
  securing a retainer to the structure for retaining the latch in an installed position and permitting removal of the latch by hand.

18. The method of claim 17, wherein interconnecting the two pairs of opposed sidewalls of the structure to one another and securing the retainer to the structure is achieved without a measuring device.

19. The method of claim 17, wherein each sidewall of the two pairs of opposed sidewalls is formed by a laser cutting machine.

* * * * *